(No Model.)   R. NOLAN & I. A. GEORGE.   2 Sheets—Sheet 1.
RIVETING MACHINE
No. 556,367.   Patented Mar. 17, 1896.
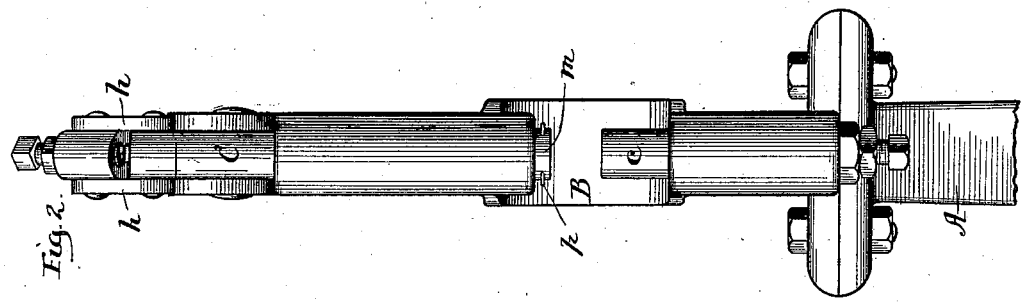
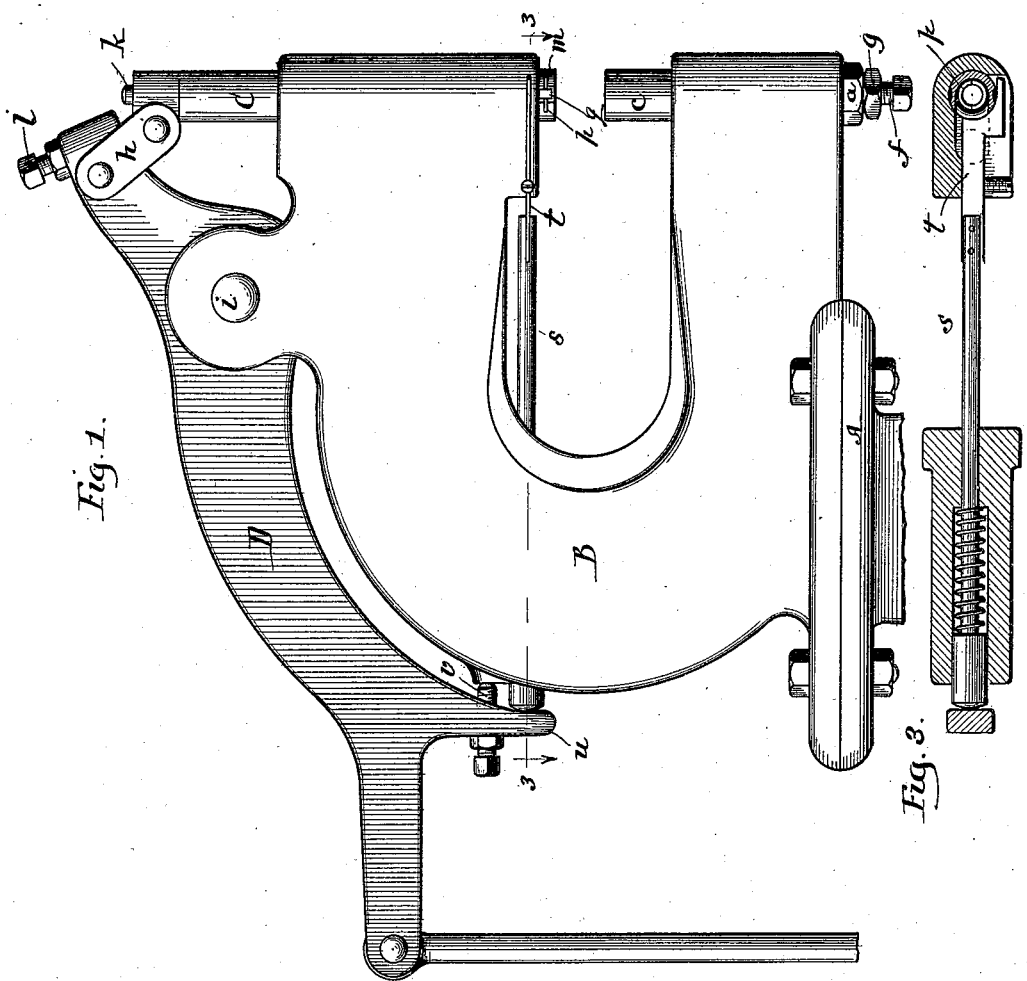

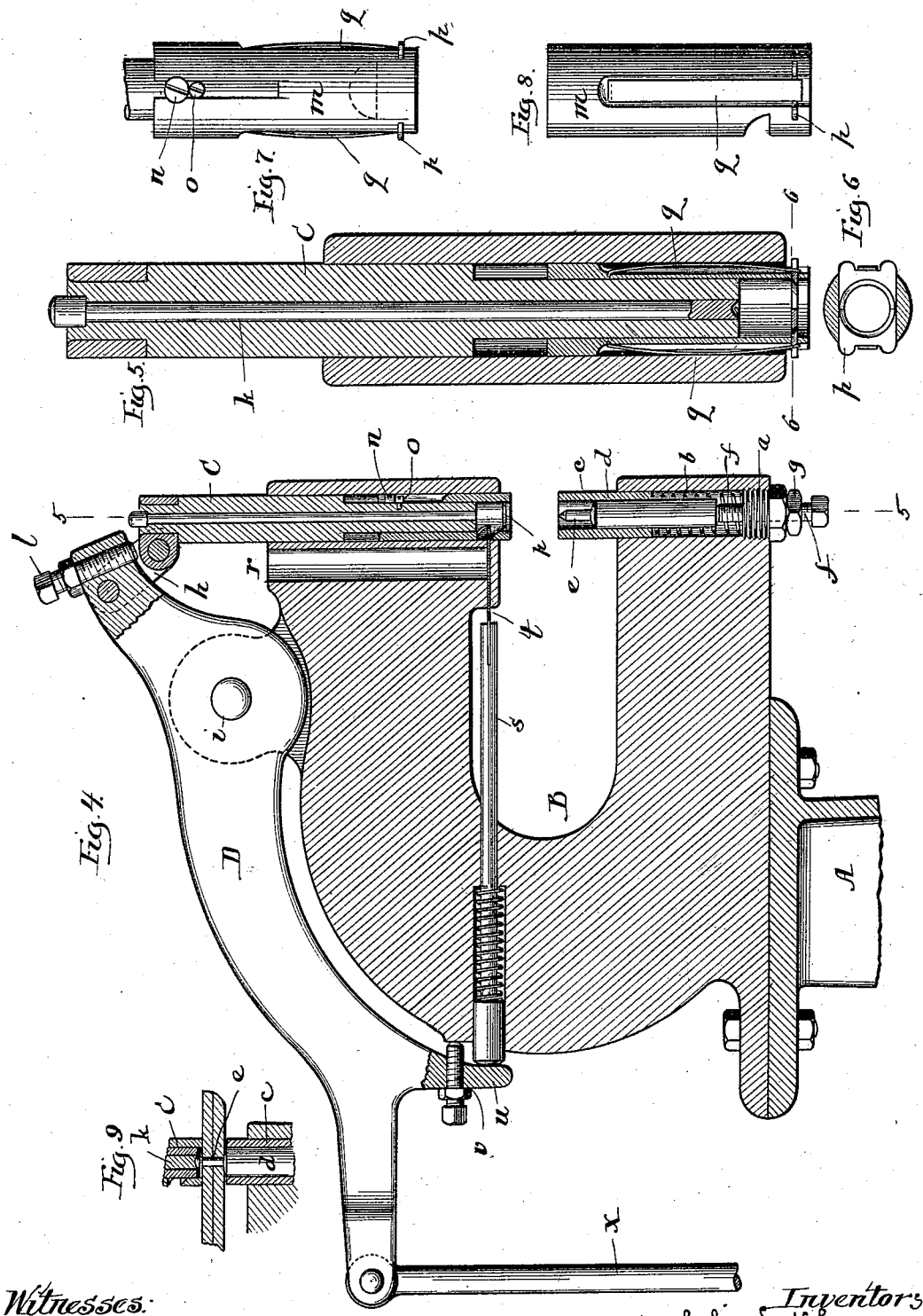

UNITED STATES PATENT OFFICE.

RICHARD NOLAN AND ISAAC A. GEORGE, OF HASTINGS, NEBRASKA.

RIVETING-MACHINE.

SPECIFICATION forming part of Letters Patent No. 556,367, dated March 17, 1896.

Application filed October 9, 1894. Serial No. 525,367. (No model.)

*To all whom it may concern:*

Be it known that we, RICHARD NOLAN and ISAAC A. GEORGE, residents of Hastings, county of Adams, State of Nebraska, have invented certain new and useful Improvements in Riveting-Machines, of which the following is hereby declared to be a full, clear, and exact description sufficient to enable others skilled in the art to make and use the same.

The purpose of the invention is to provide a machine for driving pointed rivets through several thicknesses of leather or other material without preliminary punching, and also by the same stroke which effects the driving of the rivet to head or swage it down against the subjacent surface or washer there located. Ordinarily washers are to be supplied automatically in position proper to receive the end of the rivet as the same is driven through the work, so that by a single operation the rivet is set and fastened with its washer at the selected place, as the operator may direct.

The exact nature of the improvements will appear from the description following and be more particularly pointed out by claims at the conclusion thereof.

In the accompanying drawings like parts are designated by like letters throughout.

Figure 1 is a view in side elevation of one form of the improved machine. Fig. 2 is a view of the same in end elevation. Fig. 3 is a view in transverse section at line 3 3 of Fig. 1. Fig. 4 is a view of the machine in longitudinal section; Fig. 5, a detail section view of the driver mechanism and its adjuncts; Fig. 6, a view in cross-section at line 6 6 of Fig. 5; Figs. 7 and 8, elevation views of the washer-holder detached; Fig. 9, detail view in section with the driver mechanism at the limit of its descent against the work.

Upon a suitable standard A is mounted the U-frame B, which is bored through at opposite points to receive the confronting parts of the riveting mechanism. A nut $a$ is tapped into the hole in the lower limb of the frame and carries a coil-spring $b$ upon which rests the tubular table $c$ for the work. The table $c$ slides snugly within the bore of the frame and receives within it the cylindrical anvil $d$, upon which the head of the rivet $e$ can be set. The anvil is sustained at its base upon the bolt $f$ threaded to the nut $a$ and set in desired position by the lock-nut $g$. The bolt $f$ enables the anvil to be raised or lowered at will to accommodate rivets of different lengths.

Within the trued bore of the upper limb of the U-frame snugly moves the driver C, secured by link $h$ to the tilt-lever D, pivoted, as at $i$, on the main frame. At the axial line of the driver C is loosely set the swage-pin $k$, headed, as shown, so that when seated the lower end of the pin comes about flush with the lower face of the driver C. The terminal of the swaging-pin is slightly countersunk, as appears, to receive the pointed end of the rivet when the driver descends. A tap-screw $l$ carried by the tilt-lever contacts with the head of the swage-pin just before the limit of descent is reached and thus holds the pin stoutly to its work of swaging down the rivet to clinch it in position. By adjusting the tap $l$ a slight play of the swage-pin $k$ is allowed at the moment of contact with the point of the rivet, which is less upset in consequence by the action of the pin.

At its lower portion the driver C is reduced in diameter and receives thereon the tubular sleeve $m$. Said sleeve bears externally against the bore in the machine-head, so that the sleeve and the driver thus mutually coact to guide each other during their to-and-fro play within the bore. A threaded pin $o$, projected from driver C through a slot in sleeve $m$, encounters a like pin $n$ upon said sleeve and serves to suspend the sleeve in dependent fashion with its lower end extended slightly beyond the driver.

When the driver descends, the dependent sleeve first contacts with the work and comes to a standstill, while the slot connection allows the driver to proceed separately until the inset-ledge of the driver bears stoutly against the confronting or upper end of the sleeve. Thereupon both sleeve and driver descend farther in unison to fully depress the yielding table and force the rivet completely through the work. Sleeve $m$ acts as a receiving-chamber for the washers, which are delivered singly thereto and retained in proper position within the chamber preliminary to the descent of the driver C.

In cross-slots near the lower end of the sleeve $m$ slide the companion jaw-plates $p$, which are made to abut together by the action of the plate-springs $q$ bearing thereon and carried by the thimble $m$.

A hopper $r$ in the U-frame at the side of the driver C contains a supply of washers, which may be fed singly from beneath through a notch in the sleeve $m$ in position to rest upon the jaw-plate $p$. To this end a slide $t$ closes the bottom of the hopper $r$, and by a rod $s$ spring-seated in the U-frame is actuated through a lug $u$ of the tilt-lever D. A set-screw $v$ at the side of the slide $t$ holds it in true play, while the lug $u$ thrusts the slide forward to feed the washer into the sleeve $m$. The washer is thrust into the sleeve at the end of the upward stroke of the driver C and is there held by the spring-jaw $p$ until the driver in its descent to fasten the next rivet forces the washer out of the sleeve onto the face of the work and in position centrally above the rivet. The slide-jaws $p$ at the base of the washer-chamber formed by the dependent sleeve $m$ are slightly beveled, as appears. The washer can thus easily clear the sleeve, and yet is held momentarily within the chamber during descent of driver C until the latter begins to force the rivet-tip up through the work. At such juncture the washer is released and almost immediately the swage-pin contacts with the emerging rivet-point, yields slightly thereto, perhaps, according to the position of the stop or tappet $l$, and at last, being stoutly held by said stop, quickly upsets the rivet at high, low, or medium swage against the adjacent face of the washer.

By adjusting the anvil at its seat in the table the machine readily adapts itself to various thicknesses of material in keeping with the length of rivet selected, while the adjustment of tappet $l$ controls the play of the swage-pin in the driver and upsets the rivet end, high or low, as may be requisite. The work being in position, a single stroke of lever D and its treadle-rod $x$ fastens the rivet and its washer securely to place without any preliminary punching.

Obviously the details of the structure can be varied without departing from the essentials of the invention. For example, if the seat for the rivet on the anvil be slightly counterbored a central recess is made which will receive and center the head of a tubular rivet of smaller size.

The machine will drive and swage a tubular or a solid rivet with equal success.

Having thus described the invention, what we claim as new, and desire to secure by Letters Patent, is—

1. The combination with the anvil to seat the rivet-head of the driver confronting said anvil, the movable swage-pin carried by said driver and having a limited play therein and a stop engaging said movable pin to determine the play thereof and its swaging contact with the rivet-tip, substantially as described.

2. The combination with the anvil to seat the rivet-head and with the yielding table to inclose said anvil of the reciprocating driver confronting said anvil, the movable swage-pin carried by said driver and having a limited play therein and an adjustable stop engaging said movable pin to variably determine the play thereof and its swaging contact with the rivet-tip on descent of the driver, substantially as described.

3. The combination with the tilt-lever and its link of the reciprocating driver sustained thereby, the movable swage-pin carried by said driver and having a limited play therein and the tappet mounted on the lever to encounter the projecting end of said pin and determine the play thereof in its swaging contact with the rivet-tip, substantially as described.

4. The combination with the yielding table and with the anvil inclosed thereby of the confronting driver reciprocating in the bore of the machine-head and having a reduced lower portion, the tubular sleeve rigid against lateral spread, surrounding said reduced portion, dependent yieldingly therefrom to constitute a hollow chamber, and contacting at the limit of descent with the inset ledge or shoulder on the reduced portion of the driver, and the companion spring-jaws extending across the sleeve above its lower end to form the base of the chamber therein, substantially as described.

5. The combination with the reciprocating driver of the inclosing tubular sleeve dependent yieldingly therefrom to constitute a washer-chamber, the spring slide-jaws extended across the sleeve above the end thereof to form the base of the chamber and the feed-slide timed by suitable mechanism to project a washer into the chamber through a side inlet of the sleeve and deposit the same on the spring-jaws, substantially as described.

RICHARD NOLAN.
ISAAC A. GEORGE.

Witnesses:
F. J. SCHAUFELBERGER,
R. W. HASKIN.